Patented July 1, 1947

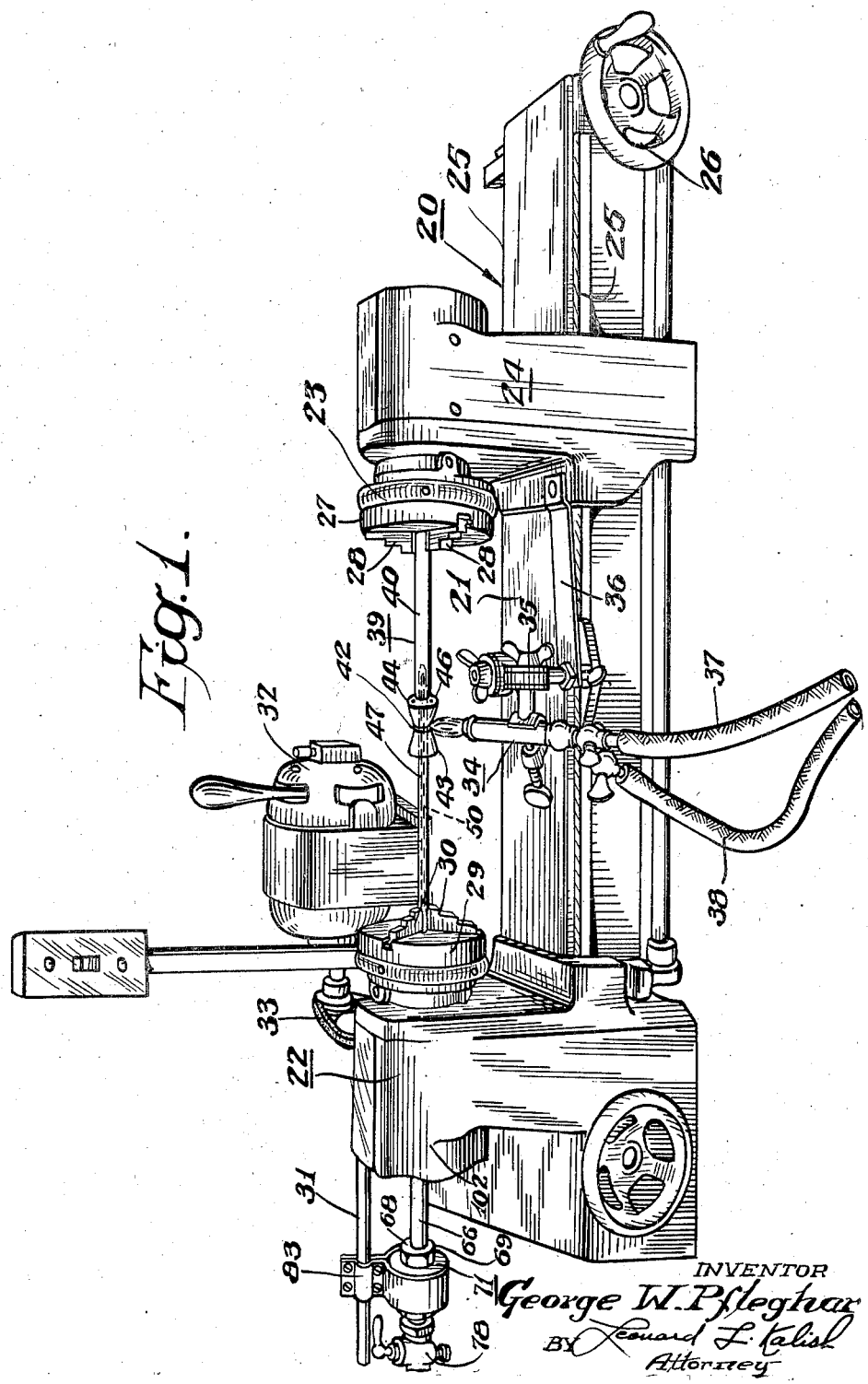

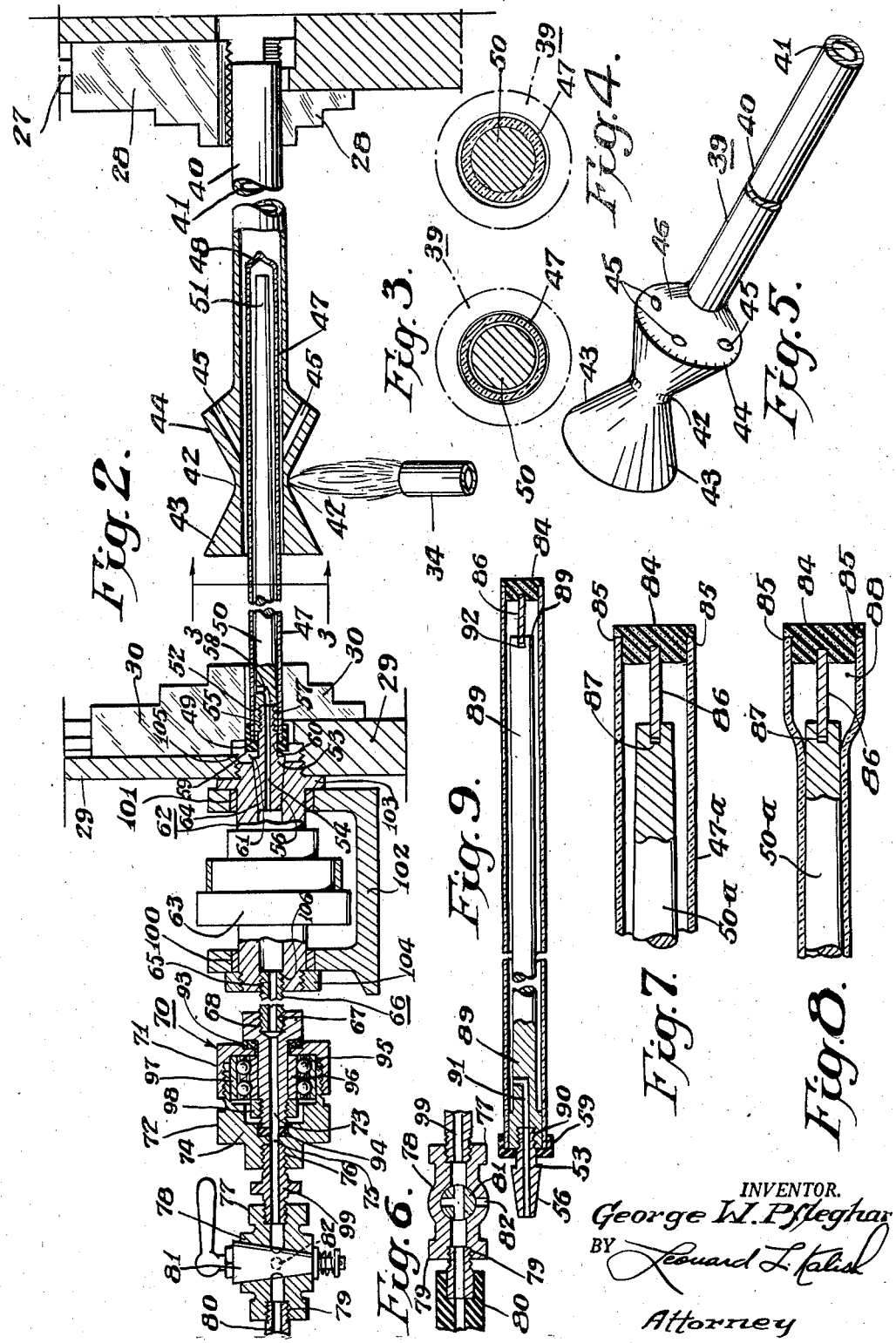

2,423,113

UNITED STATES PATENT OFFICE 2,423,113

APPARATUS FOR MAKING PRECISION-BORE TUBES

George W. Pfleghar, Upper Moreland Township, Montgomery County, Pa., assignor to Fischer & Porter Company, Hatboro, Pa., a corporation of Pennsylvania Application February 5, 1944, Serial No. 521,168

5 Claims. (Cl. 49—7)

The present invention relates to apparatus for making precision-bore tubing or the like of glass or other thermoplastic material.

An object of the present invention is to provide certain new and useful apparatus for making glass, quartz and other thermoplastic products containing a precision-bore.

In the manufacture of scientific or precision glass, quartz, synthetic plastic and other similar apparatus, need arises in certain situations for providing a tapered or a uniform-diametered elongated chamber or bore of great accuracy or precision within a body of glass, quartz, synthetic plastic or other similar material.

Thus, for instance, in the manufacture of glass or other ceramic or synthetic plastic rotameter tubes, or in the manufacture of burettes, pipettes, thermometer tubes, manometer tubes, capillary tubes, etc. of various scientific and medical instruments, a high degree of precision is desirable and indeed necessary in the bore of the tube or apparatus, whether such bore be a tapered bore or a parallel bore or a bore of any other predetermined internal shape.

With the apparatus of the present invention, precision-bores in glass, quartz, synthetic plastic and other similar tubes and other products can be formed with such accuracy or precision and with such uniformity of result as to permit such precision tubes and apparatus to be mass-produced without any loss of accuracy or deterioration of quality and so as to permit the calibration of such bores by the application thereto of a predetermined standardized calibration which will become an accurate calibration for all of such mass-produced precision-bore tubes or apparatus for the reason that the successively produced tubes or apparatus will have their respective bores so identical that the calibration which will be suitable and appropriate for one will be equally suitable and appropriate for the others and, indeed, for all which may be formed to the same bore-size or bore-pattern.

A further object of the present invention is to provide an apparatus whereby precision-bore tubes and apparatus may be produced of glass, quartz, synthetic plastic and other thermoplastic material with a minimum breakage or loss due to internal strains in the finished product. Still another object of the present invention is to provide an apparatus which will facilitate production and reduce the cost of production of such precision-bore tubes and apparatus.

With the above and other objects and advantages in view which will appear more fully from the following detailed description, appended claims and accompanying drawings, the present invention contemplates a process whereby a glass (or quartz or synthetic plastic or other thermoplastic) tube is progressively conformed to an internal metallic mandrel having the exact predetermined size and shape (within the requisite tolerances allowable) by the progressive application of several stages of heat to the glass tube and the simultaneous application of a collapsing or conforming pressure to the tube, so that the first heat-stage, as it moves along the tube, gradually, will pre-heat the tube, while the second and higher heat-stage softens the tube to the collapsing on conforming temperature, while the third and somewhat lower heat-stage serves to anneal the tube while it cools to the hardening or "setting" temperature, so as to avoid any internal strains and stresses within the glass or other material after it has "set" to the precision-bore determined by the mandrel.

The present invention further contemplates apparatus whereby such multiple heat-stages may be effectively applied, progressively along the length of the tube.

For the purpose of illustrating the invention, there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings, in which like reference characters indicate like parts throughout:

Figure 1 represents a perspective view of one embodiment of the present invention, adapted for producing precision-bore tubes having tapered inner bores, as it appears in use.

Figure 2 represents an enlarged schematic view partly in elevation and partly in vertical cross-section of the embodiment of Figure 1.

Figure 3 represents a vertical cross-sectional view generally along the line 3—3 of Figure 2.

Figure 4 represents a view generally similar to that of Figure 3 but showing the glass tube collapsed upon the mandrel.

Figure 5 represents a perspective view of the heating element forming part of the embodiment of Figure 2.

Figure 6 represents a horizontal cross-sectional view of the 3-way valve of Figure 2.

Figure 7 represents a fragmentary cross-sectional view of another embodiment of the present invention in which a plug seals the free end of the glass tube and also supports and centers the mandrel.

Figure 8 represents a view generally similar to that of Figure 7 but showing the glass tube collapsed.

Figure 9 represents a view partly in elevation and partly in cross-section of another embodiment employing a mandrel which may be used in producing precision-bore tubes having cylindrical inner bores.

In the embodiment of Figures 1 to 6, I may provide a glass-working lathe shown generally in Figure 1 and indicated by the reference character 20. The lathe 20 includes a bed or frame 21, a headstock 22 and a tailstock 23. The headstock 22 is immovably held on the bed or frame 21 while the tailstock 23 is positioned upon a carriage 24 which is slidably mounted upon guide rails 25 extending generally longitudinally along the bed 21. Any suitable manual or automatic feeding means may be provided for moving the tailstock 23 toward and away from the headstock 22. For example, a hand wheel 26 may be employed to move the tailstock through any suitable rack-and-pinion or other conventional mechanism (not shown).

The tailstock 23 is provided with a centering chuck 27 having a plurality (for example 3) of gripping or chuck jaws 28.

The headstock 22 is provided with a centering chuck 29 having a plurality (for example 3) of gripping or chuck jaws 30.

A burner 34 is adjustably carried by a support 35 which is slidably mounted upon one of the guide rails 25 of the lathe. The support 35 is rigidly connected to the tailstock 23 by a link 36, whereby movement of the tailstock 23 will also move the support 35 and the burner 34.

The burner 34 is provided with a fuel hose 37 (through which illuminating gas or acetylene or hydrogen or any other suitable gaseous fuel may be fed under pressure) and an air hose 38 (through which air or oxygen may be fed under pressure).

Where a material such as a thermoplastic synthetic resin (having a low softening temperature) is being worked, it may be desirable to eliminate the use of air under pressure and, instead of the burner 34, a burner resembling a conventional Bunsen burner or the like may be employed.

While, in Figure 1, a single burner 34 is shown mounted upon the front edge of the lathe bed 21, the present invention also contemplates, as an alternative construction, the similar mounting of a second burner at the rear edge of the lathe bed (upon the other guide rail 25) in cases where a higher temperature or greater uniformity of heat is desired.

A spool-shaped heating element 39 of stainless steel or the like is supported from the tailstock 23 through an integral tubular portion 40 which is gripped by the jaws 28 of the chuck 27 as shown particularly in Figure 2.

The heating element 39 is provided with a cylindrical opening 41 extending axially therethrough and in continuation of the tubular portion 40. The outer periphery of the heating element 39 is beveled or grooved so that the central portion 42 thereof has only a small thickness of metal, whereas the leading portion 43 and the trailing portion 44 have considerably greater thicknesses of metal.

A plurality of inclined sight or view openings 45 extend outwardly and rearwardly from the central portion of the axial opening 41 of the heating element 39 to the inclined trailing edge 46 of said element 39 so as to permit the central zone of the axial opening 41 to be viewed from the outside of the heating element.

A cylindrical length of glass tubing 47 (the tubing 47 may instead, be of quartz, synthetic plastic, or any other suitable thermoplastic material) having one end sealed off as at 48, is supported from the head stock 22 as will be hereinafter described.

The axial opening 41 and the tubular portion 40 of the heating element 39 have a somewhat greater diameter than the outside diameter of the tubing 47 so that, when the tailstock 23 is moved toward the headstock 22, the tubing 47 extends through the opening 41 and into the tubular portion 40 and so that a slight annular clearance is maintained intermediate the tubing 47 and the opening 41 and the portion 40.

When it is desired to form the tubing 47 into a precision-bore tapered tube suitable for use as the metering tube of a rotameter, a mandrel 50 is inserted within the tubing 47 through the open end 49 thereof. The mandrel 50, which is of stainless steel or other suitable heat-resistant material, is smoothly tapered along most of its length; the outer periphery of the tapered portion of the mandrel 50 being machined or otherwise formed with a high degree of accuracy so as to conform to the predetermined inner bore of the final tapered tube to be produced. As can be seen particularly in Figure 2, the smaller end 51 of the mandrel 50 terminates just short of the sealed end 48 of the tubing 47. The larger end 52 of the mandrel 50 terminates just inside of the open end 49 of the tubing 47. The mandrel 50 may be tapered throughout its entire length or may have its larger end 52 cylindrical and adapted to fit snugly within the tubing 47 so as better to center the mandrel 50 relative to the tubing 47.

An adapter 53 having an opening 54 extending axially therethrough is externally screw-threaded at one end as at 55 and is provided with a male standard Morse taper 56 at its other end. The screw-threaded end 55 of the adapter 53 may be detachably connected within an axial screw-threaded socket 57 formed in the larger end 52 of the mandrel 50. A conduit 58 leads from the socket 57 of the mandrel 50 to the outside of the tapered portion of said mandrel—the opening 54 in the adapter 53 being in communication with the conduit 58 when said adapter 53 is inserted within the socket 57 of the mandrel 50.

A centrally-apertured sealing gasket 59 (which may be of suitable synthetic rubber or other somewhat flexible material capable of withstanding fairly high temperatures) is snugly fitted about the neck 60 of the adapter 53 and fits over the open end 49 of the tubing 47, an outer annular flange 61 of said gasket 59 snugly closing the open end 49 of said tubing 47.

The headstock 22 is provided with a spindle 62 having an opening 63 extending axially therethrough. The spindle 62, which is shown schematically in Figure 2, may be rotatably mounted within the headstock 22 in any conventional manner, as for instance within aligned bushings 100 and 101 provided in the spaced arms of a support 102. The spindle may be provided with an annular retaining shoulder 103 at one end and a screw-threaded retaining collar 104 at its other end and is externally screw-threaded as at 105 to receive the chuck 29. The spindle 62 is provided with external pulleys 63, whereby said spindle can be rotated by a motor 32 and drive belt 33 through a conventional intermediate drive belt (not shown).

The inner end of the spindle 62 is provided with a female standard Morse taper as at 64, which is adapted snugly to receive the complementary male taper 56 of the adapter.

The spindle 62 thus rotatably supports and centers the mandrel 50 and the tubing 47. The jaws 30 of the chuck 29 may also be used to grip and center the tubing 47 as shown in Figure 2, although this may be dispensed with and, indeed, the chuck 29 may be removed entirely, if desired.

The other end of the spindle 62 is internally screw-threaded as at 106 to receive one end 65 of a double-ended axially-apertured externally screw-threaded connector 66.

The other end 67 of the connector 66 is detachably connected to an internally screw-threaded socket 68 provided on the outer end of the rotating element 69 of a rotating pressure joint 70.

The rotating pressure joint 70 may be of any conventional construction (as for example that shown in U. S. Patent 2,107,405, issued to S. T. Williams on February 8, 1938) and may include screw-threadedly connected housing elements 71 and 72. The rotating element 69, which has an opening 73 extending axially therethrough, is provided with a gasket 93 intermediate it and the housing element 71 and terminates in close proximity to an apertured gasket 94 set in a stationary sealing element 74 formed in the other housing element 72. A conduit 75 extends from the gasket 94 and communicates with an internally screw-threaded opening 76.

The element 69 is rotatable upon balls 95 mounted intermediate an inner race 96 (tightly mounted on the element 69) and an outer stationary race 97 within the housing element 71; the race assembly being held together by a nut 98 screw-threadedly mounted on the forward end of the element 69.

A suitable grade of grease is provided within the housing elements 71 and 72 of the rotating pressure joint 70 whereby a fluid-tight seal is effected intermediate the rotating element 69 and the stationary sealing element 74.

The rotating pressure joint 70 is held in axial alignment with the mandrel 50 by a clamp 83 adjustably positioned upon a supporting rod 31 extending from the headstock.

One arm 77 of a stopcock 78 is connected to the opening 76 of the rotating pressure joint 70 by a double-ended screw-threaded connector 99; the other arm 79 of said stopcock 78 being connected to a length of flexible pressure tubing 80 leading to a suction pump (not shown).

The stopcock 78 is adapted for three-way connection. Thus, when the rotatable plug 81 of the stopcock 78 is in the position shown in Figure 6, there is a direct connection between the suction pump and the tubing 47 whereby said tubing 47 can be exhausted. If the plug 81 is rotated 90° clockwise from the position shown in Figure 6, the tubing 47 will be vented to the atmosphere through the opening 82 in the body of the stopcock; the suction tubing 80 being kept sealed. If, on the other hand, the plug 81 is rotated 90° counterclockwise from the position shown in Figure 6, the tubing 47 will be kept sealed while the suction tubing 80 will be vented to the atmosphere through the opening 82. If the plug 81 is turned 180° from the position shown in Figure 6, both the tubing 47 and the suction tubing 80 will be vented to the atmosphere through the opening 82. If the plug 81 is rotated 45° in either direction from the position shown in Figure 6, the communication between the suction tubing 80 and the glass tubing 47 will be broken but both will remain sealed off.

The process of converting the cylindrical glass tubing 47, to a length of tubing having a tapered inner bore will now be described.

The mandrel 50 is inserted within the tubing 47, the tubing 47 is installed within the head stock 22 and connection is made between the tubing 47 and the suction tubing 80 in the manner described hereinabove.

The tail stock 23 is backed away from the head stock 22 (that is, the tail stock is moved toward the right in Figure 2) and the heating element 39 is installed in the manner described hereinabove.

The burner 34 is then lighted and the flame is directed at the thin central portion 42 of the heating element 39, which is then allowed to heat up.

After the heating element 39 has been heated to the desired temperature, the tail stock is moved slowly (toward the left in Figure 1) toward the head stock 22 by operation of the hand wheel 26 until the heating element 39, passing over the rotating glass tubing 47, comes in contact with the jaws 30. The heating element 39 is held in this left-most position for a few moments and is then brought slowly (toward the right in Figure 1) back along the tubing 47 to the sealed end 48 thereof by opposite rotation of the hand wheel 26. This operation is merely for the purpose of giving the glass tubing a preliminary warming up.

Suction is then applied to the glass tubing 47 (either by turning on the suction pump or, if two or more units are connected to a single large suction reservoir, by turning the previously closed stopcock 78 to the position shown in Figure 6 so that the vacuum from the reservoir is transmitted to the tubing 47). If desired, a suitable manometer (not shown) may be installed within the suction line 80 to indicate the degree of suction transmitted to the tubing 47; high softening point material such as quartz requiring a greater vacuum than lower softening point materials such as soft glass and synthetic plastic. The heating element 39 is then moved slowly (to the left in Figure 1) along the rotating glass tubing 47 away from the sealed end 48 thereof, at a rate of motion which will soften the glass progressively along its length sufficiently to permit the suction progressively to collapse the softened portion into contact with the tapered mandrel 50 so that the inner bore of the glass tubing 47 will assume the shape of the mandrel.

Due to the greater thickness of metal at the leading portion 43 and the trailing portion 44 than at the central portion 42 of the heating element 39 and, due also to the fact that the flame of the burner 34 impinges directly upon the central portion 42, the leading and trailing ends of the axial opening 41 of the heating element 39 will be at a lower temperature than the center of said axial opening 41.

Thus, the leading portion 43 of the heating element 39 preheats the glass tubing 47 gradually before the hottest central portion 42 reaches any particular part of the glass tubing and, after the hottest central portion 42 has softened the tubing 47 sufficiently to cause collapse thereof upon the mandrel 50, the somewhat cooler trailing portion 44 serves to anneal the collapsed glass tube after it has cooled sufficiently to re-harden and set in its collapsed portion.

The openings 45 in the heating element 39 permit visual inspection of the glass tubing 47 at the central hottest portion of the opening 41 in the heating element 39 and thus enable the operator to determine when the tubing has collapsed so that the operator can regulate the rate of movement of the tail stock 23 and the heating element 39 accordingly.

It is apparent from the foregoing description that the glass tubing 47 is progressively pre-heated, softened, collapsed upon the tapered mandrel, re-hardened and finally annealed in its tapered form; the action of the suction, the steady axial rotation of the tubing 47 and the uniformly progressive application of the pre-heating, softening, and annealing stages all serving to produce a final product in which the tapered inner bore conforms precisely and accurately to the tapered outer periphery of the mandrel and in which the glass (or other material) is free from undesirable stresses, strains, and imperfections.

After the tail stock 23 has been moved as far as possible to the left (until the heating element 39 comes in contact with the jaws of the chuck 29), the burner 34 is shut off and the tail stock 23 is moved back to the right sufficiently to permit the heating element 39 to clear the collapsed tubing 47.

The stop-cock 78 is then turned (90° clockwise from the position shown in Figure 6) to permit air to enter the annular space intermediate the un-collapsed larger end 49 of the tubing 47 and the mandrel 50 (to permit easier removal of the collapsed tubing from the mandrel), the rotation of the spindle 62 is stopped, the jaws 30 are opened, and the tubing, mandrel and adapter are removed from the lathe and the tubing is finally removed from the mandrel 50.

In forming a rotameter tube from the length of tapered tubing 47 the untapered ends of the tube are cut off and polished and a set of master calibrations provided therefor. The calibrations may be applied directly to the glass by etching or otherwise or they may be applied to a separate scale to be placed in juxtaposition with the metering tube in the rotameter as is conventional in the art.

Due to the fact that each of the tapered tubes produced upon a given mandrel according to the process of the present invention is identical (within the limits of permissible error) with every other tube so produced, a single master scale of calibration is applicable to all of the tubes; it being unnecessary individually to calibrate each separate tube as is required when such tubes are produced by conventional methods heretofore employed.

Another embodiment of the present invention is shown in Figures 7 and 8 in which the glass tubing 47—a (instead of being sealed off as at 48 in Figure 2) is left open and a generally cylindrical sealing plug 84 (of asbestos composition or other suitable heat-resistant material) having an annular shoulder 85 is inserted within the free end of the tubing 47—a. The plug 84 is provided with a central pin 86 extending inwardly therefrom and adapted to enter an axially-extending slot 87 formed at the smaller end of the tapered mandrel 50—a.

The sealing plug 84 is sucked into fluid-tight sealing relationship with the end of the glass tube 47—a when said tube is evacuated. The pin 86 serves to support the smaller end of the mandrel 50—a and thus insures perfect axial alignment of the mandrel 50—a relative to the tubing 47—a.

As shown particularly in Figure 8, the tubing 47—a is collapsed a short distance in from its free end so that a closed space 88 is provided intermediate the collapsed portion of the tubing 47—a and the sealing plug 84. Since the closed space 28 is cut off from the source of suction, the air therewithin expands under the influence of the applied heat and ultimately unseats the sealing plug 84 and allows air to enter the space 88. It has been found that this entry of air into the space adjacent the smaller end of the mandrel permits easier removal of the mandrel from the glass after the forming operation has been completed.

In Figure 9, there is shown an alternative form of mandrel 89 which has a cylindrical outer surface and is adapted to form tubing or the like having a precision cylindrical inner bore such as is used, for example, in burettes. The mandrel 89 is provided, at one end, with a screw-threaded socket 90 and a suction conduit 91 for connection to the adapter 53, and is provided, at its other end, with an axial slot 92 for connection to the pin 86 of the sealing plug 84.

The apparatus of the present invention is superior to those heretofore employed in that the present apparatus, by the continuously-advancing, pre-heating, softening and annealing operations, in conjunction with the use of vacuum and in conjunction with the rotation of the tube, gives a more accurate and uniform inner bore and produces a final product which is relatively free from internal stresses and strains.

The present apparatus is also superior to those heretofore employed in that heating of the tube is effected largely by radiant heat, although conduction and convection play some part in heating the glass (or other material) tube. It has been found that the use of radiant heat gives more uniform heat distribution and thus prevents overheating and the formation of "hot spots," thereby giving a more uniform and strain-free product as well as lengthening the life of the mandrel.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, what I claim as new and desire to protect by Letters Patent is:

1. Apparatus for forming tubing or the like having a precision bore comprising a lathe having a movable tail stock and having a head stock provided with a rotatable spindle, said head and tail stocks having aligned centering chucks, an axially apertured heating element supported from said tail stock chuck, a burner supported from said tail stock and adapted externally to heat said heating element, a mandrel rotatably mounted upon the head stock spindle and extending co-axially within a tube of thermoplastic material rotatably supported from the head stock chuck, said tube being adapted to enter the axial aperture in said heating element and to provide an annular clearance therewithin upon inward movement of said tail stock, means for evacuating said tube during rotation thereof, and means for gradually moving said tail stock so as gradually to move said heating element axially along said rotating evacuated tube thereby continuously to collapse the heated portion of said rotating evacuated tube upon said mandrel.

2. Apparatus for forming tubing or the like having a precision bore comprising a lathe having a movable tail stock and having a head stock provided with a rotatable spindle, said head and tail stocks having aligned centering chucks, a mandrel rotatably carried by the head stock spindle and extending co-axially within an oversize tube of thermoplastic material rotatably supported from the head stock chuck, means for evacuating said tube during rotation thereof, an indirect heating element supported from said tail stock chuck in alignment with said tube, said heating element having an axial opening therethrough somewhat greater in diameter than said tube, and means supported from said tail stock and for externally heating said heating element.

3. Apparatus for forming tubing or the like having a precision bore comprising a lathe having a movable tail stock and having a head stock provided with a rotatable spindle, said head and tail stocks having aligned centering chucks, a mandrel rotatably carried by the head stock spindle and extending co-axially within an oversize tube of thermoplastic material rotatably supported from the head stock chuck, means for evacuating said tube during rotation thereof, an indirect heating element supported from said head stock chucks in alignment with said tube, said heating element having an axial opening therethrough somewhat greater in diameter than said tube, said heating element being thicker at the leading and trailing portions thereof than at the central portion thereof, and means supported from said tail stock and for externally heating the central portion of said heating element whereby the central portion of its axial opening will be at a higher temperature than the leading and trailing portions of said opening.

4. Apparatus for forming tubing or the like having a precision bore comprising a lathe having a movable tail stock and having a head stock provided with a rotatable spindle, said head and tail stocks having aligned centering chucks, a mandrel rotatably carried by the head stock spindle and extending co-axially within an oversize tube of thermoplastic material rotatably supported from the head stock chuck, an indirect heating element supported from said tail stock chuck in alignment with said tube, said heating element having an axial opening therethrough somewhat greater in diameter than said tube, said heating element being of metal or the like and being thicker at the leading and trailing portions thereof than at the central portion thereof, means supported from said tail stock and for externally heating the central portion of said heating element whereby the central portion of its axial opening will be at a higher temperature than the leading and trailing portions thereof, and means for gradually moving said tail stock so as gradually to move said heating element axially along said tube, thereby progressively to pre-heat, to soften and collapse upon said mandrel, and to anneal successive portions of said rotating tube.

5. Apparatus for forming tubing or the like having a precision bore comprising a lathe having a movable tail stock provided with a chuck, and having a head stock provided with a rotatable spindle, a mandrel rotatably supported by said spindle and extending generally horizontally therefrom within an oversize tube of thermoplastic material rotatably supported from the head stock, an elongated axially-apertured metallic element extending horizontally from the tail stock chuck and being adapted to enclose said tube upon inward movement of said tail stock, and means supported from said tail stock for heating the free end of said metallic element thereby progressively to collapse said tube upon said mandrel upon inward movement of said tail stock.

GEORGE W. PFLEGHAR.

REFERENCES CITED

The following references are of record in the file of this patent:

UNITED STATES PATENTS

| Number | Name | Date |
| --- | --- | --- |
| 2,286,401 | Everett | June 16, 1942 |
| 1,301,714 | Keuppers | Apr. 22, 1919 |
| 786,259 | Bournique | Apr. 4, 1905 |
| 1,446,026 | Wetmore | Feb. 20, 1923 |
| 1,676,795 | Mailey et al. | July 10, 1928 |
| 2,272,105 | Anastor | Feb. 3, 1942 |
| 2,323,182 | Stuckert | June 29, 1943 |
| 1,912,405 | Ronci | June 6, 1933 |

FOREIGN PATENTS

| Number | Country | Date |
| --- | --- | --- |
| 488,710 | France | July 16, 1918 |